United States Patent [19]
Kanai et al.

[11] Patent Number: 5,589,976
[45] Date of Patent: Dec. 31, 1996

[54] TELESCOPE WITH REAR CONVERTER AND REAR CONVERSION LENS AND TELESCOPE

[75] Inventors: Moriyasu Kanai; Hirofumi Matsuo, both of Tokyo, Japan

[73] Assignee: Asahi Kogaku Kogyo Kabushiki Kaisha, Tokyo, Japan

[21] Appl. No.: 362,888

[22] Filed: Dec. 23, 1994

[30] Foreign Application Priority Data

Dec. 28, 1993 [JP] Japan ................... 5-70809 U
Dec. 5, 1994 [JP] Japan ................... 6-301183

[51] Int. Cl.⁶ .................. G02B 21/36; G02B 23/00; G02B 15/02; G02B 13/00
[52] U.S. Cl. .................. 359/362; 359/399; 359/675; 359/646; 359/673; 359/744; 359/674
[58] Field of Search .................. 359/399, 675, 359/646, 673, 744, 676

[56] References Cited

U.S. PATENT DOCUMENTS

| | | | |
|---|---|---|---|
| 4,286,844 | 9/1981 | Nagler | 359/644 |
| 4,900,141 | 2/1990 | Ohshita | 359/675 |
| 5,140,467 | 9/1992 | Hotta et al. | 359/696 |

FOREIGN PATENT DOCUMENTS 62-138815  6/1987  Japan .

*Primary Examiner*—Thong Nguyen
*Assistant Examiner*—Mohammad Y. Sikder
*Attorney, Agent, or Firm*—Greenblum & Bernstein, P.L.C.

[57] ABSTRACT

A telescope includes a master telescope whose aberration has been independently corrected and which has an objective lens and an ocular lens. A rear conversion lens is provided on the image side of the objective lens of the master telescope and is made of a single lens having a concave surface that faces an object side. The rear conversion lens meets the requirements defined by the following relationships: $f_o'/f_o>1$ and $0.5<(dx_2/dh_2)/(dx_1/dh_1)<1.3$, wherein "$f_o$" represents the focal length of the objective lens of the master telescope; "$f_o'$" represents the resultant focal length of the objective lens of the master telescope and the rear conversion lens; "$dx_1/dh_1$" represents an inclination of an incident surface of the rear conversion lens at an incident point thereof, upon which light is incident at a height $h_1$; "$dx_2/dh_2$" represents an inclination of an emission surface of the rear conversion lens at an emission point thereof, at which light is emitted from the rear conversion lens at a height $h_2$; $h_1=0.36(f_o)^2/mf_o$; $h_2=0.36(f_o)/m$, and m is the magnification of said master telescope.

9 Claims, 11 Drawing Sheets

I, 589,976

TELESCOPE WITH REAR CONVERTER AND REAR CONVERSION LENS AND TELESCOPE

BACKGROUND OF THE INVENTION

1. Field of the Invention

The present invention relates to a telescope (including a binocular telescope).

2. Description of Related Art

In a conventional telescope, it is possible to incorporate a conversion lens (rear conversion lens) on an image side of an objective lens of a master telescope whose aberration has been independently corrected to thereby achieve a telescope having a modified magnification. The requirements to incorporate such a rear conversion lens (referred to as a rear converter) are as follows: 1) no reduction of the eye relief occurs; 2) no eclipse of ambient light takes place; and, 3) there is no remarkable change in the entire length of the telescope. To try to meet these requirements, it has been proposed to make the rear converter of a single lens, for example in Japanese Unexamined Patent Publication No. 62-138815. However, this proposal cannot satisfactorily meet all the requirements.

SUMMARY OF THE INVENTION

The primary object of the present invention is to provide a telescope having a rear converter which is added to obtain a modified magnification, wherein neither the reduction of the eye relief nor the eclipse of ambient light occurs.

Another object of the present invention is to provide a rear conversion lens for such a telescope.

To achieve the object mentioned above, according to an aspect of the present invention, there is provided a telescope with a rear converter, which includes a master telescope whose aberration has been independently corrected and which has an objective lens and an ocular lens, and a rear conversion lens provided on the image side of the objective lens of the master telescope and made of a single lens having a concave surface that faces an object side. The rear conversion lens meets the requirements defined by formulae (1) and (2);

$$f_o'/f_o > 1 \tag{1}$$

$$0.5 < (dx_2/dh_2)/(dx_1/dh_1) < 1.3 \tag{2}$$

wherein, "$f_o$" designates the focal length of the objective lens of the master telescope; "$f_o'$" the resultant focal length of the objective lens of the master telescope and the rear conversion lens; "$dx_1/dh_1$" the inclination of the incident surface of the rear conversion lens at an incident point thereof, upon which light is made incident at a height $h_1$; and, "$dx_2/dh_2$" the inclination of the emission surface of the rear conversion lens at an emission point thereof, at which light is emitted from the rear conversion lens at a height $h_2$; respectively, and wherein $h_1 = 0.36(f_o)^2/mf_o'$, $h_2 = 0.36(f_o)/m$, and m=magnification of the master telescope, respectively.

Preferably, the rear conversion lens is provided with at least one aspherical surface, so that the aberration can be easily corrected.

According to another aspect of the present invention, there is provided a telescope with a rear converter, which includes a master telescope whose aberration has been independently corrected and which has an objective lens and an ocular lens, and a rear conversion lens provided on the image side of the objective lens of the master telescope and made of a single lens having a concave surface that faces an object side. The rear conversion lens has a function to increase the focal length of the objective lens without changing the position of an exit pupil of the objective lens as viewed from an image surface thereof.

Preferably, when the focal lengths $f_o$ and $f_e$ of the objective lens and the ocular lens of the master telescope satisfy the following relationship;

$$f_o/f_e = (1+\alpha)m$$

($|\alpha| \leq 0.05$, m=magnification (integer), $1 \leq m \leq 20$) the following relationship is satisfied;

$$f_o'/f_e = (1+\alpha')(m+p) \tag{3}$$

wherein $|\alpha'| \leq 0.05$ $p=1, 2, 3, 4$ or 5, wherein, "p" designates an added magnification by the rear conversion lens. According to another aspect of the present invention, there is provided a telescope which includes an ocular lens having a single lens with a concave surface that faces an object side and a positive lens group, in this order from the object side, and the following relationships are satisfied;

$$f_{e\,2}/f_e' > 1 \tag{4}$$

$$0.5 < (dx_3/dh_3)/(dx_4/dh_4) < 1.3 \tag{5}$$

wherein $f_e'$=focal length of the ocular lens;

$f_{e\,2}$=focal length of the positive lens group;

$dx_3/dh_3$=inclination of the incident surface of the single lens at an incident point thereof, upon which light is made incident at a height $h_3$;

$dx_4/dh_4$=inclination of the emission surface of the single lens at an emission point thereof, at which light is emitted from the single lens at a height $h_4$;

$h_3 = 0.36(f_e')^2/f_e^2$;

$h_4 = 0.36(f_e)$.

Preferably, the single lens is provided with at least one aspherical surface, so that the aberration can be easily corrected.

According to still another aspect of the present invention, provision is made of a rear conversion lens proper.

Namely, a rear conversion lens for a master telescope whose aberration has been independently corrected and which has an objective lens and an ocular lens can be provided on an image side of the objective lens of the master telescope. The rear conversion lens is made of a single lens having a concave surface that faces the object side and satisfies the following relationships;

$$f_o'/f_o > 1 \tag{1}$$

$$0.5 < (dx_2/dh_2)/(dx_1/dh_1) < 1.3 \tag{2}$$

wherein, "$f_o$" designates the focal length of the objective lens of the master telescope; "$f_o'$" the resultant focal length of the objective lens of the master telescope and the rear conversion lens; "$dx_1/dh_1$" the inclination of the incident surface of the rear conversion lens at an incident point thereof, upon which light is made incident at a height $h_1$; and, "$dx_2/dh_2$" the inclination of the emission surface of the rear conversion lens at an emission point thereof, at which light is emitted from the rear conversion lens at a height $h_2$;

respectively, and wherein $h_1=0.36(f_o)^2/mf_o'$, $h_2=0.36f_o/m$, and m=magnification of the master telescope, respectively.

According to still another aspect of the present invention, there is provided a conversion lens for a master telescope whose aberration has been independently corrected and which has an objective lens and an ocular lens. The rear conversion lens is provided on an image side of the objective lens of the master telescope, and functions to increase the focal length of the objective lens without changing the position of an exit pupil of the objective lens as viewed from an image surface thereof.

The present disclosure relates to subject matter contained in Japanese Utility Model Application No. 5-70809 (filed on Dec. 28, 1993) and Japanese patent application No. 6-301183 (filed on Dec. 5, 1994) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
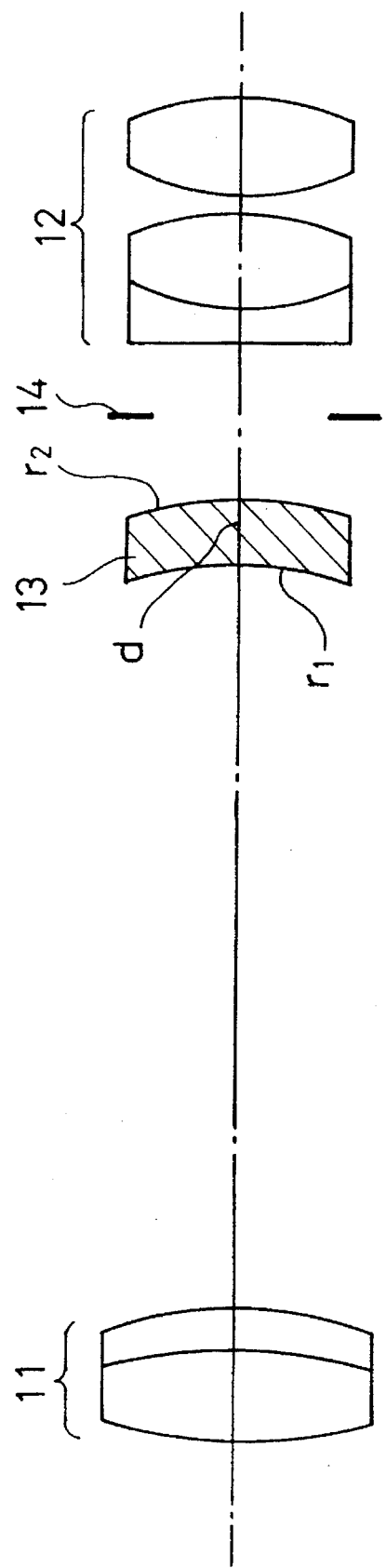
FIG. 1 is a schematic view of a lens arrangement of a telescope having a rear converter of a single lens incorporated therein, according to the present invention.
Figure 2:
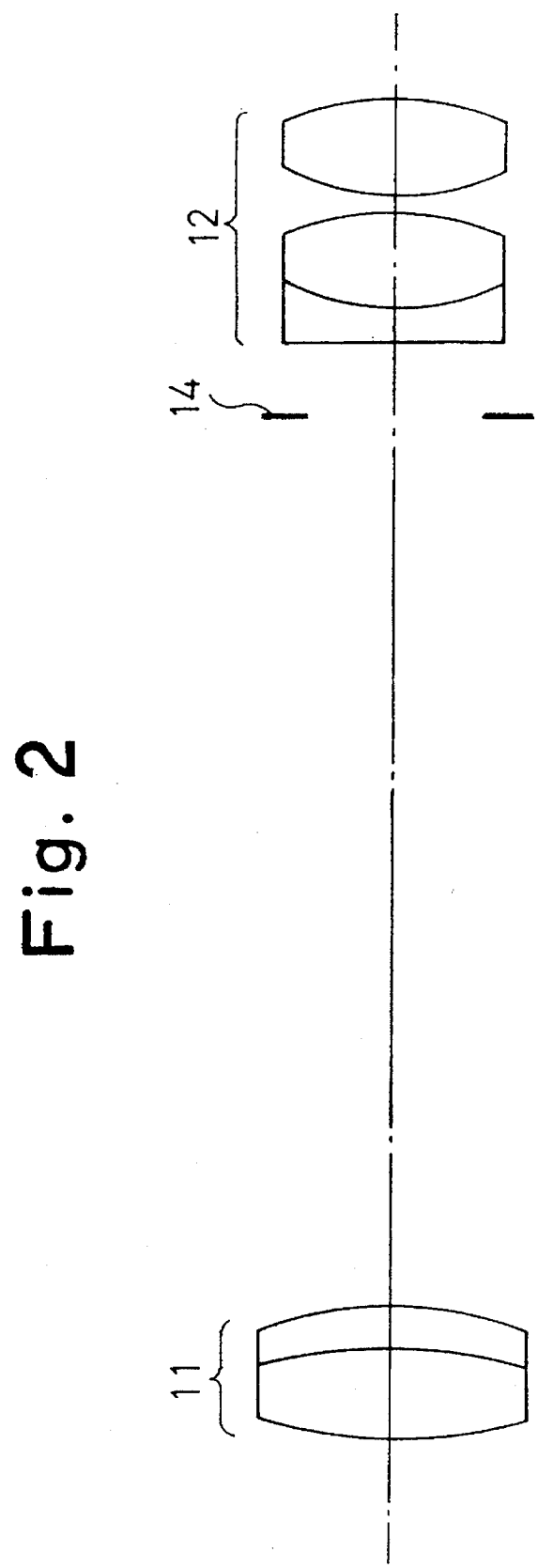
FIG. 2 is a schematic view of a lens arrangement of a master telescope having no rear conversion lens shown in FIG. 1.

FIG. 1 shows a lens arrangement of a telescope having a rear conversion lens (rear converter) and FIG. 2 shows a lens arrangement of a master telescope whose aberration has been independently corrected.

The master telescope is comprised of an objective lens group 11 and an ocular lens group 12. The telescope shown in FIG. 1 additionally includes a rear conversion lens 13 which is provided on the image side of the objective lens group 11. The telescopes shown in FIGS. 1 and 2 have different magnifications and can be individually marketed. Alternatively, it is possible to market the telescopes as a single product having different magnifications.

Numeral 14 designates a field stop provided in front of the ocular lens group 12 or between the ocular lens group 12 and the rear converter 13. The focusing or adjustment of a diopter can be carried out by the movement of 1) the rear converter 13 only; 2) the rear converter 13, the field stop 14, and the ocular lens group 12 together; 3) both the field stop 14 and the ocular lens group 12 together; 4) the ocular lens group 12 only; or 5) the objective lens group 11 only, in the optical axis direction.

The rear converter 13 of a telescope according to the present invention is made of a single lens which meets the requirements defined in formulae (1) and (2). Formula (1) provides that the single lens is a magnifying lens, that is, the single lens increases the focal length to a value larger than that of the master telescope to thereby magnify an image. The single lens has a first surface (concave surface of negative power) that faces an object to increase the focal length of the objective lens system, and a second surface which is adapted to return the exit pupil of the objective lens group which has been moved by the first concave surface to an initial position.

Formula (2) specifies the requirement to minimize a change in the position of the exit pupil of the objective lens group as viewed from the image surface between the absence and presence of the rear converter 13, to thereby prevent the ambient light from being eclipsed by the ocular lens group 12 or the eye relief from being reduced. In conventional telescopes, the addition of the single lens (rear converter) causes the position of the exit pupil of the objective lens group as viewed from the image surface to change considerably, and consequently, the eclipse of the ambient light by the ocular lens group 12 or the reduction of the eye relief takes place.

Figure 3:
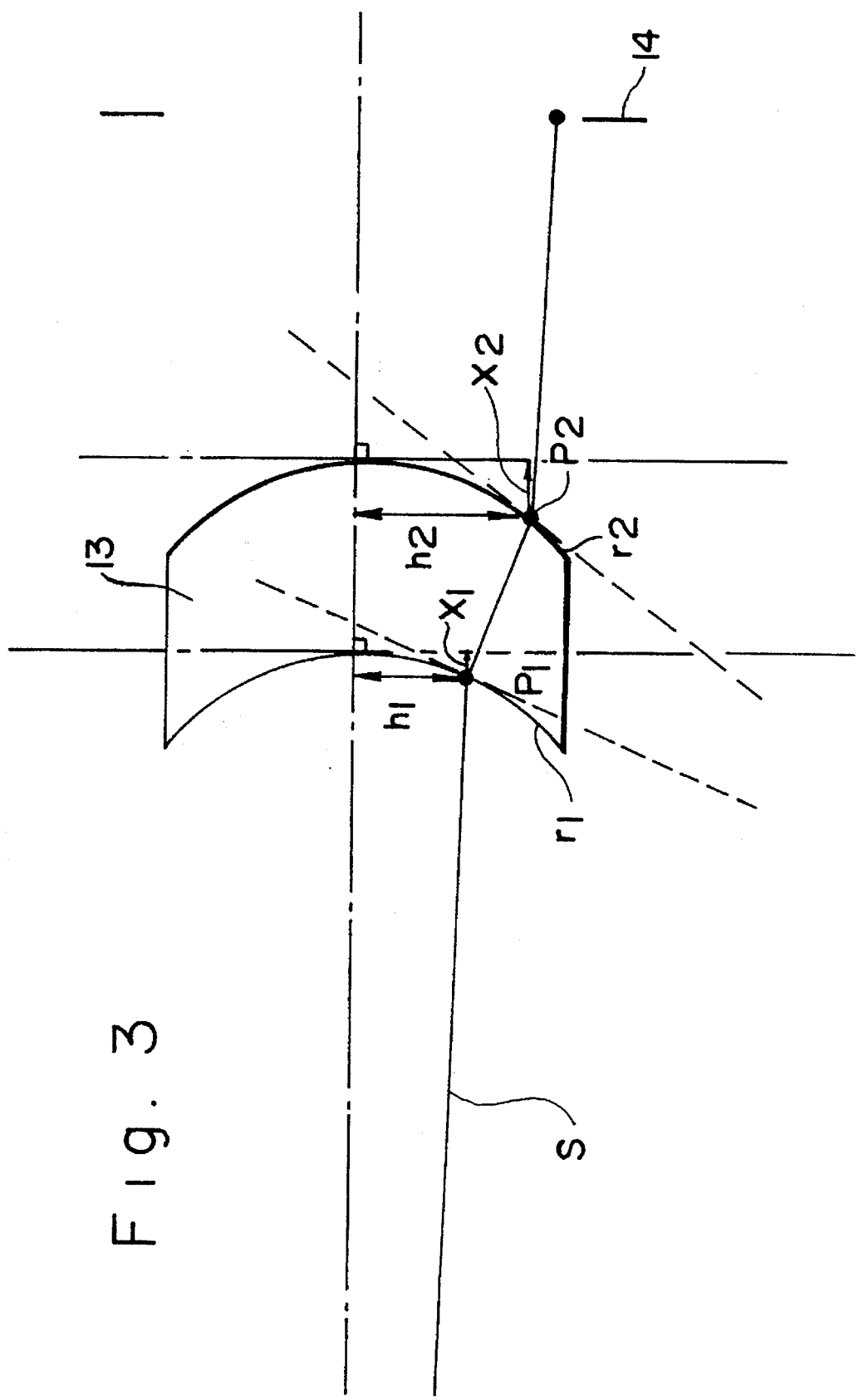
FIG. 3 is an explanatory view of a principal ray of ambient light incident upon a rear conversion lens of a telescope according to the present invention.

The above-mentioned requirements will be discussed below in detail with reference to FIGS. 3 through 6. In FIG. 3, it is assumed that the principal ray S of the ambient light is made incident upon the first surface r1 of the rear converter 13 at the point P1 having a height h1 from the optical axis and is emitted from the second surface r2 at the point P2 having a height h2 from the optical axis. The term $x_1$ represents a distance along the optical axis direction, from a tangent plane of a lens surface perpendicular to the optical axis, to a point on the incident lens surface. Similarly, $x_2$ represents a distance along the optical axis direction, from a tangent plane of a lens surface perpendicular to the optical axis to a point on the emission lens surface. The values of $dx_1/dh_1$ and $dx_2/dh_2$ represent the inclination of tangential planes at the points P1 and P2, respectively. Formula (2) specifies the ratio between the inclination of the first and second surfaces r1 and r2.

The value of dx/dh is given by the following equation (a);

$$dx/dh=[Ch/\{1-(K+1)C^2h^2\}^{3/2}]+\Sigma 2iA_{2i}h^{2i-1} (i=1\sim 6) \quad (a)$$

wherein $C=1/r$.

Figure 4:
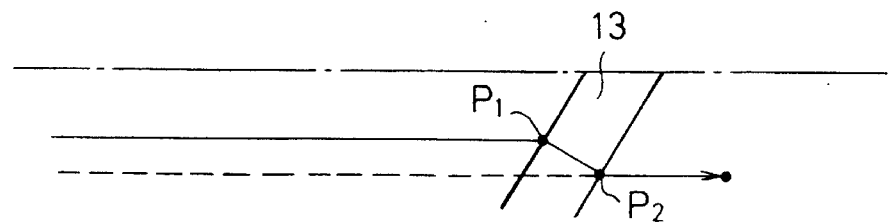
FIG. 4 is an explanatory view of an optical function of a rear conversion lens of a telescope when an exit pupil of an objective lens shown is infinite in FIG. 3, according to the present invention.

FIG. 4 shows an arrangement when the exit pupil of the objective lens is infinite. When the rear converter 13 to be added is deemed to be a plane-parallel plate at the incident and emitting positions of the principal ray S, the exit pupil is retained at an infinite distance. Namely, $$(dx_2/dh_2)/(dx_1/dh_1)=1. \quad (2-1)$$

Figure 5:
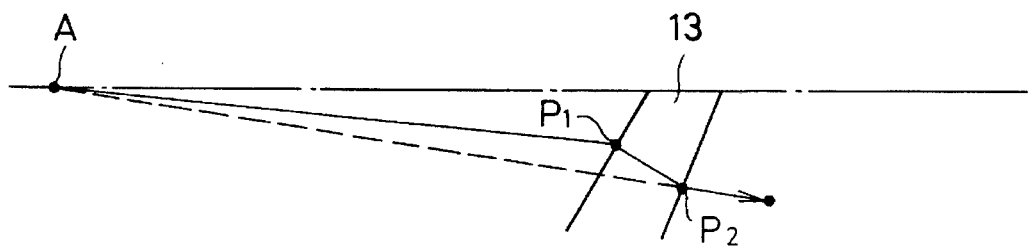
FIG. 5 is an explanatory view of an optical function of a rear conversion lens of a telescope when an exit pupil of an objective lens is located at a finite position close to the objective lens in FIG. 3, in comparison with a telescope having no rear conversion lens, according to the present invention.

FIG. 5 shows an arrangement when the exit pupil of the objective lens is located at a finite distance position "A" on the objective lens side. The principal rays S incident upon the rear converter 13 at the respective points P1 and P2 of different heights radially run from the exit pupil. That is, when the exit pupil is located at a finite distance position, the principal rays S incident upon the rear converter 13 at points of different heights are not parallel. For instance, when the exit pupil is located on the object side, the principal ray is oriented outward from the optical axis as the image height increases. Namely, there is no more outward orientation of the principal ray so long as the absolute value of $(dx_2/dh_2)$ is not smaller than the absolute value of $(dx_1/dh_1)$, i.e., $|dx_2/dh_2| \geq |dx_1/dh_1|$. The position of the exit pupil "A" considerably varies depending on the objective lens. Therefore, if the following relationship is satisfied, the position of the exit pupil can be returned to the initial position in spite of the incorporation of the rear converter 13:

$$0.5<(dx_2/dh_2)/(dx_1/dh_1)<1.0. \quad (2-2)$$

Figure 6:
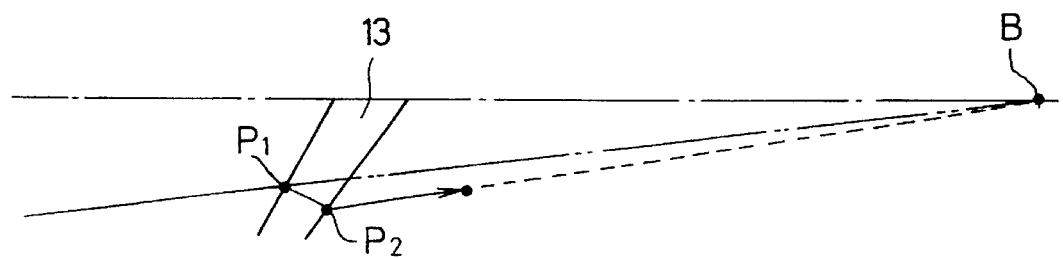
FIG. 6 is an explanatory view of an optical function of a rear conversion lens of a telescope when an exit pupil of an objective lens is located at a finite position close to an eyepiece in FIG. 3, in comparison with a telescope having no rear conversion lens, according to the present invention.

FIG. 6 shows a lens arrangement when the exit pupil is located at a finite position "B" on the ocular lens side, as in a Galilean system. The principal rays S are oriented inward toward the optical axis as the image height increases. Namely, the absolute value of $(dx_2/dh_2)$ must be larger than the absolute value of $(dx_1/dh_1)$, i.e., $|dx_2/dh_2|>dx_1/dh_1$. Therefore, if the following relationship is satisfied, the position of the exit pupil can be returned to the initial position in spite of the incorporation of the rear converter 13:

$$1.0<(dx_2/dh_2)/(dx_1/dh_1)<1.3. \quad (2-3)$$

Formula (2) includes the requirements defined by formulae (2-1), (2—2) and (2-3). If the value of formula (2) is below the lower limit, the addition of the rear converter 13 causes the exit pupil to be moved considerably toward the ocular lens side, so that light is substantially eclipsed by the edge of the ocular lens system. If the value of formula (2) exceeds the upper limit, the addition of the rear converter 13 causes the exit pupil to be moved considerably toward the objective lens side, so that the eye relief becomes too short. In the formulae mentioned above, it is practically preferable that the values of $h_1$ and $h_2$, be calculated at an image height at which the apparent half field of view is 20°. If the exit pupil is located far away, the height at which the principal ray in the vicinity of the image surface passes is substantially identical to the image height.

$h_2=f_e \tan 20°$ ($f_e=f_o/m$, $\tan 20°=0.36$)

Therefore, $h_2=0.36 f_o/m$.

Furthermore, $h_1=h_2 f_o/f_o'$.

Therefore, $h_1=0.36 f_o^2/mf_o'$ wherein m=magnification of the master telescope.

A conventional spherical lens can easily meet the requirement defined by formula (2), provided that $f_o'/f_o<1.15$.

In order to correct the curvature of the field or the distortion, it is possible to increase the lens thickness to thereby increase the radius of curvature of each lens surface. However, this solution inevitably invites an increase in the whole length of the lens system. To this end, in the present invention, the rear converter is provided with at least one aspherical lens surface so as to meet the requirement defined by the formula (2).

It can be considered that the rear converter used in the present invention has a function to lengthen the focal length of the objective lens without changing the position of the exit pupil.

In general, the magnification "m" of a telescope is represented by an integer having a tolerance of ±5%. Accordingly, we have;

$$f_o/f_e=(1+\alpha)m$$

($\alpha \leq 0.05$)m:magnification (integer), $1 \leq m \leq 20$)

wherein $f_o$ and $f_e$ designate the focal lengths of the objective lens and the ocular lens, respectively.

Consequently, the rear converter in the present invention preferably satisfies formula (3). Formula (3) ensures that an integer magnification can be obtained, regardless of the absence or presence of the rear converter. If the number of "p" exeeds 5, it becomes difficult to keep a good perfomance with a rear converter comprising a single lens. On the other hand, "p" should be 1 or more to give a function of a rear converter.

Alternatively, the ocular lens group can be comprised of a single lens having a concave surface located on the object side and a positive lens group, in this order from the object side. Formulae (4) and (5) are necessary in this alternative.

Formula (4) provides that the single lens is a reducing optical system with respect to the positive lens group. Consequently, the positive Petzval sum of the positive lens group is cancelled by the negative Petzval sum of the single lens, so that the curvature of the field can be corrected. If the value is smaller than the lower limit in the formula (4), there is a large curvature of the field.

Formula (5) specifies the requirement to determine the position of the entrance pupil of the positive lens group. The above discussion for formula (2) can be applied to formula (5). Consequently, if the value is smaller than the lower limit, the entrance pupil is considerably moved toward the positive lens group, so that the outer diameter of the positive lens group is increased, resulting in an increase in the size of the whole ocular lens system. Conversely, if the value exceeds the upper limit, the entrance pupil is considerably moved toward the object side, and hence, the eye relief is reduced.

Preferably, the single lens is provided with an aspherical surface to correct the comatic aberration. The aspherical surface is preferably such that the radius of curvature increases to be larger than the radius of curvature of the paraxial spherical surface as the height from the optical axis increases, so that the comatic aberration at the circumferential portion can be effectively compensated.

Several embodiments will be discussed below.

Master Telescope

Figure 7:
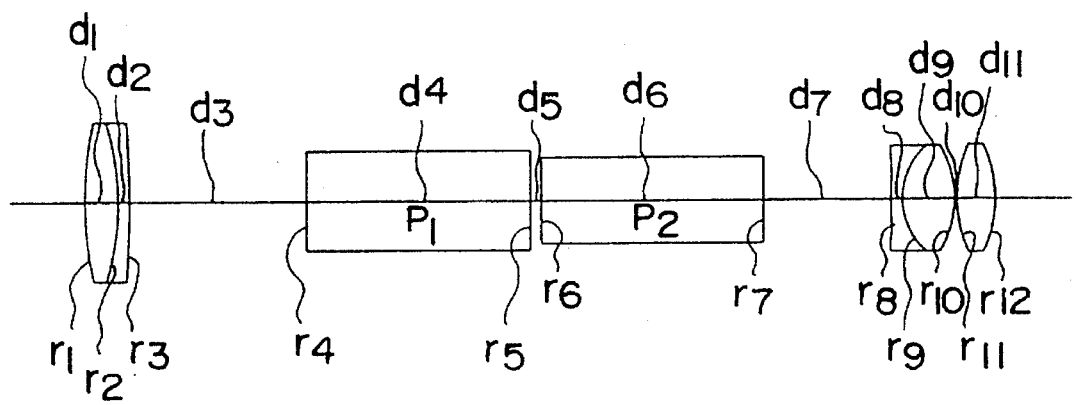
FIG. 7 is a schematic view of a lens arrangement of a master telescope by way of example.
Figure 8:
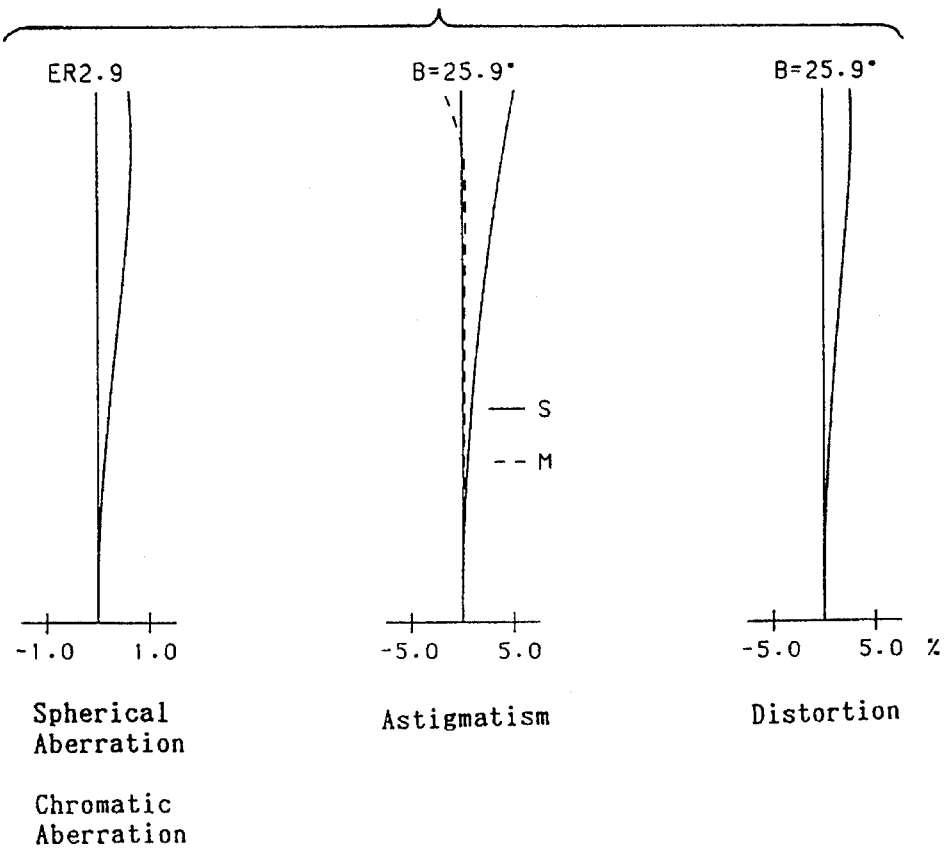
FIG. 8 shows various aberration diagrams of the master telescope shown in FIG. 7.

FIG. 7 shows a lens arrangement of a master telescope. Numerical lens data of the master telescope shown in FIG. 7 is shown in Table 1 below. Diagrams of various aberrations thereof are shown in FIG. 8. P1 and P2 designate the prisms.

In the diagrams and Table, "S" designates the sagittal ray, "M" the meridional ray, "ER" the diameter of the exit pupil, "W" the real field of view (half field of view), "B" the apparent field of view (half field of view), "R" the radius of curvature of each lens surface, "D" the thicknesses of the lenses or the distance between the lenses, "Nd" the refractive index of the d-line, and "vd" the Abbe number of the d-line, respectively.

TABLE 1

| ER = 2.9 | W = 4.0 | B = 25.9° | $f_o$ = 79.97 | $f_e$ = 11.77 |
|---|---|---|---|---|
| Surface No. | R | D | $N_d$ | $v_d$ |
| 1 | 46.478 | 4.60 | 1.51633 | 64.1 |
| 2 | −34.850 | 1.50 | 1.62004 | 36.3 |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 17.39 | — | — |
| 8* | 57.904 | 1.60 | 1.58547 | 29.9 |
| 9 | 8.960 | 7.15 | 1.49176 | 57.4 |
| 10 | −13.730 | 0.30 | — | — |
| 11 | 17.093 | 5.12 | 1.48749 | 57.4 |
| 12 | −17.903 | — | — | — |

*denotes aspherical surface.
Aspherical data;
No. 8; K = −0.895, A4 = −0.29670 × 10⁻³, A6 = −0.91000 × 10⁻⁶.

The shape of the aspheric surface can be generally expressed as follows.

$$X = CY^2 / \{1+[1-(1+K)C^2Y^2]^{1/2}\} + A_4Y^4 + A_6Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents an eighth-order aspherical factor, $A_{10}$ represents a tenth-order aspherical factor.

First Embodiment

Figure 9:
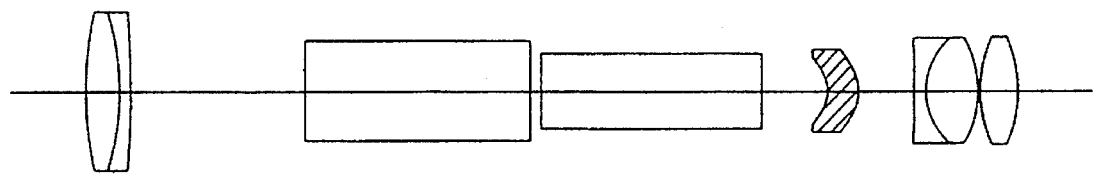
FIG. 9 is a schematic view of a lens arrangement of a master telescope shown in FIG. 7, having therein a rear conversion lens according to a first embodiment of the present invention.
Figure 10:
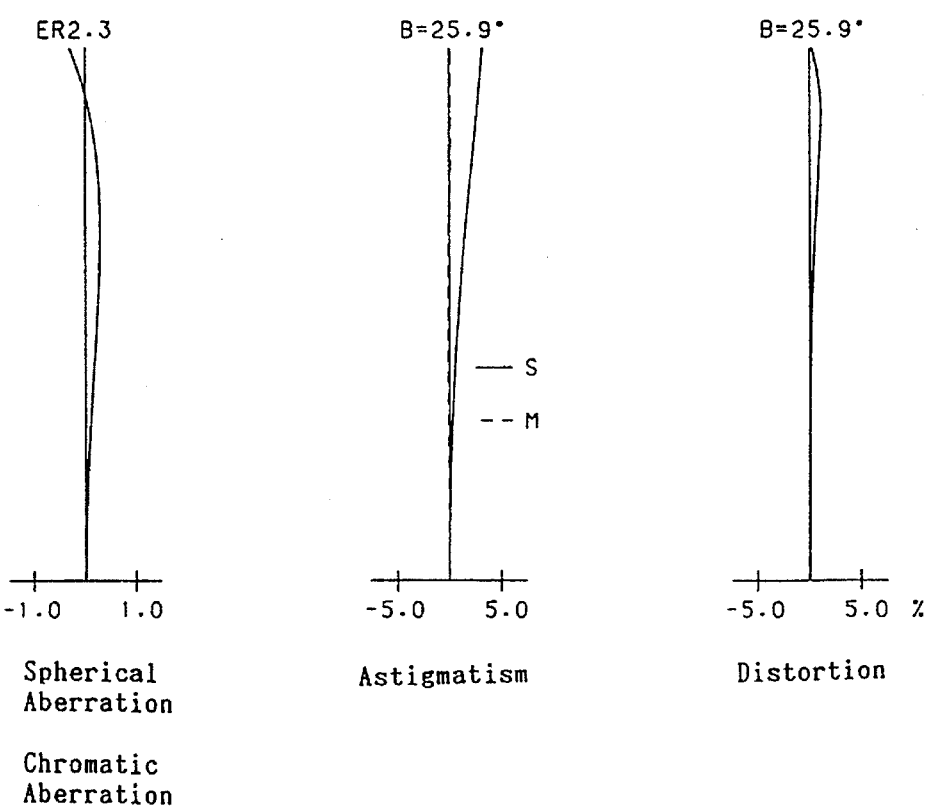
FIG. 10 shows various aberration diagrams of the telescope shown in FIG. 9.

FIG. 9 shows a lens arrangement of a telescope which is provided with the master telescope shown in FIG. 7 and the rear converter 13 (rear conversion lens) located on the image side of the objective lens group, according to a first embodiment of the present invention. Lens data of the telescope shown in FIG. 9 is shown in Table 2 below. Diagrams of various aberrations thereof are shown in FIG. 10. Surface Nos. 8 and 9 correspond to the rear conversion lens 13. In FIG. 9, the rear converter 13 is hatched.

TABLE 2

| ER = 2.3 | W = 3.2 | B = 25.9° | $f_o'$ = 103.85 |
|---|---|---|---|
| | $f_o'/f_o$ = 1.30 | | |
| Surface No. | R | D | $N_d$ | $v_d$ |
| 1 | 46.478 | 4.60 | 1.51633 | 64.1 |
| 2 | −34.850 | 1.50 | 1.62004 | 36.3 |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 9.00 | — | — |
| 8* | −4.318 | 4.30 | 1.49176 | 57.4 |
| 9* | −5.280 | 7.47 | — | — |
| 10* | 57.904 | 1.60 | 1.58547 | 29.9 |
| 11 | 8.960 | 7.15 | 1.49176 | 57.4 |
| 12 | −13.730 | 0.30 | — | — |
| 13 | 17.093 | 5.12 | 1.48749 | 57.4 |
| 14 | −17.903 | — | — | — |

*denotes aspherical surface.
Aspherical data;
No. 8; K = −0.100, A4 = −0.61770 × 10⁻⁴, A6 = 0.44200 × 10⁻⁴, A8 = −0.88830 × 10⁻⁶
No. 9; K = −0.393, A4 = 0.62160 × 10⁻³, A6 = 0.19600 × 10⁻⁴
No. 10; K = −0.895, A4 = −0.29670 × 10⁻³, A6 = −0.91000 × 10⁻⁶.

Second Embodiment

Figure 11:
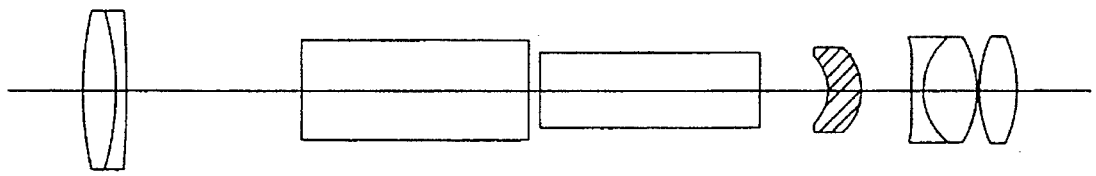
FIG. 11 is a schematic view of a lens arrangement of the master telescope shown in FIG. 7, having therein a rear conversion lens according to a second embodiment of the present invention.
Figure 12:
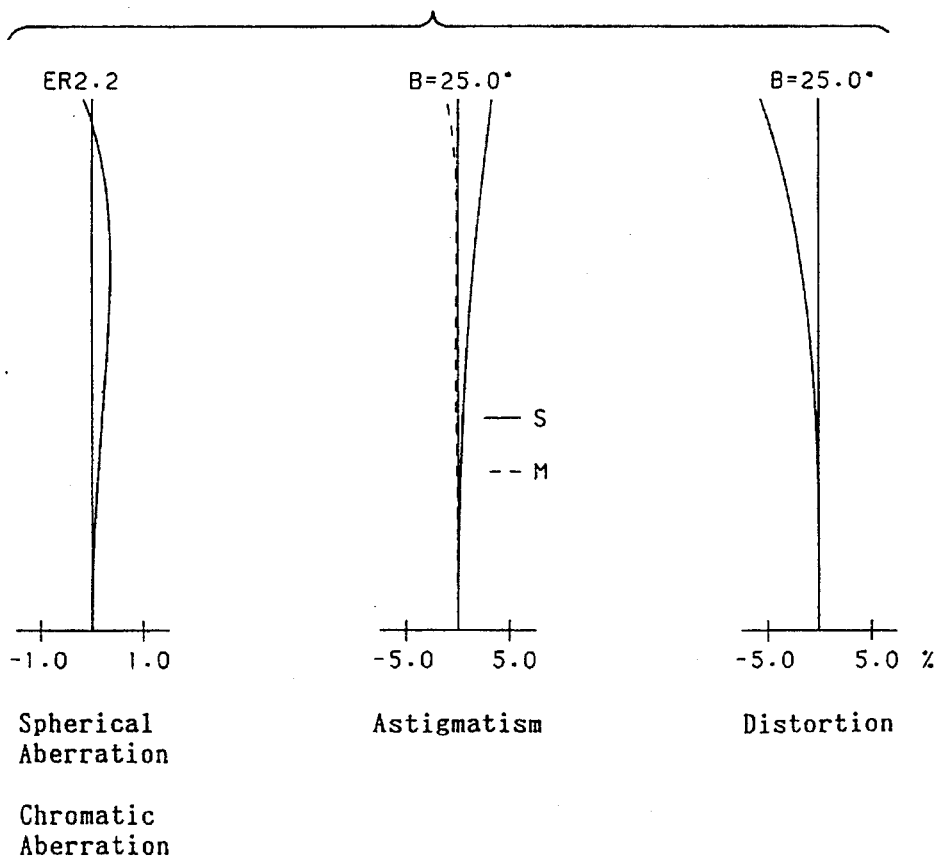
FIG. 12 shows various aberration diagrams of the telescope shown in FIG. 11.

FIG. 11 shows a lens arrangement of a telescope which is provided with the master telescope shown in FIG. 7 and the rear converter 13 (rear conversion lens) located on the image side of the objective lens group, according to a second embodiment of the present invention. Lens data of the telescope shown in FIG. 11 is shown in Table 3 below. Diagrams of various aberrations thereof are shown in FIG. 12. Surface Nos. 8 and 9 correspond to the rear conversion lens 13.

TABLE 3

| ER = 2.2 | W = 3.2 | B = 25.0° | $f_o'$ = 104.16 |
|---|---|---|---|
| | $f_o'/f_o$ = 1.30 | | |
| Surface No. | R | D | $N_d$ | $v_d$ |
| 1 | 46.478 | 4.60 | 1.51633 | 64.1 |
| 2 | −34.850 | 1.50 | 1.62004 | 36.3 |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 9.18 | — | — |
| 8* | −5.290 | 4.50 | 1.49176 | 57.4 |
| 9 | −7.554 | 6.86 | — | — |
| 10* | 57.904 | 1.60 | 1.58547 | 29.9 |
| 11 | 8.960 | 7.15 | 1.49176 | 57.4 |
| 12 | −13.730 | 0.30 | — | — |
| 13 | 17.093 | 5.12 | 1.48749 | 57.4 |
| 14 | −17.903 | — | — | — |

*denotes aspherical surface.
Aspherical data;
No. 8; K = −0.100, A4 = 0.69574 × 10⁻⁴, A6 = 0.65033 × 10⁻⁵, A8 = −0.69316 × 10⁻⁶
No. 10; K = −0.895, A4 = −0.29670 × 10⁻³, A6 = −0.91000 × 10⁻⁶.

Third Embodiment

Figure 13:
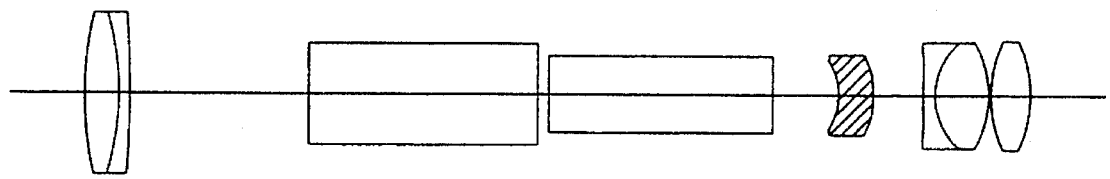
FIG. 13 is a schematic view of a lens arrangement of the master telescope shown in FIG. 7, having therein a rear conversion lens according to a third embodiment of the present invention.
Figure 14:
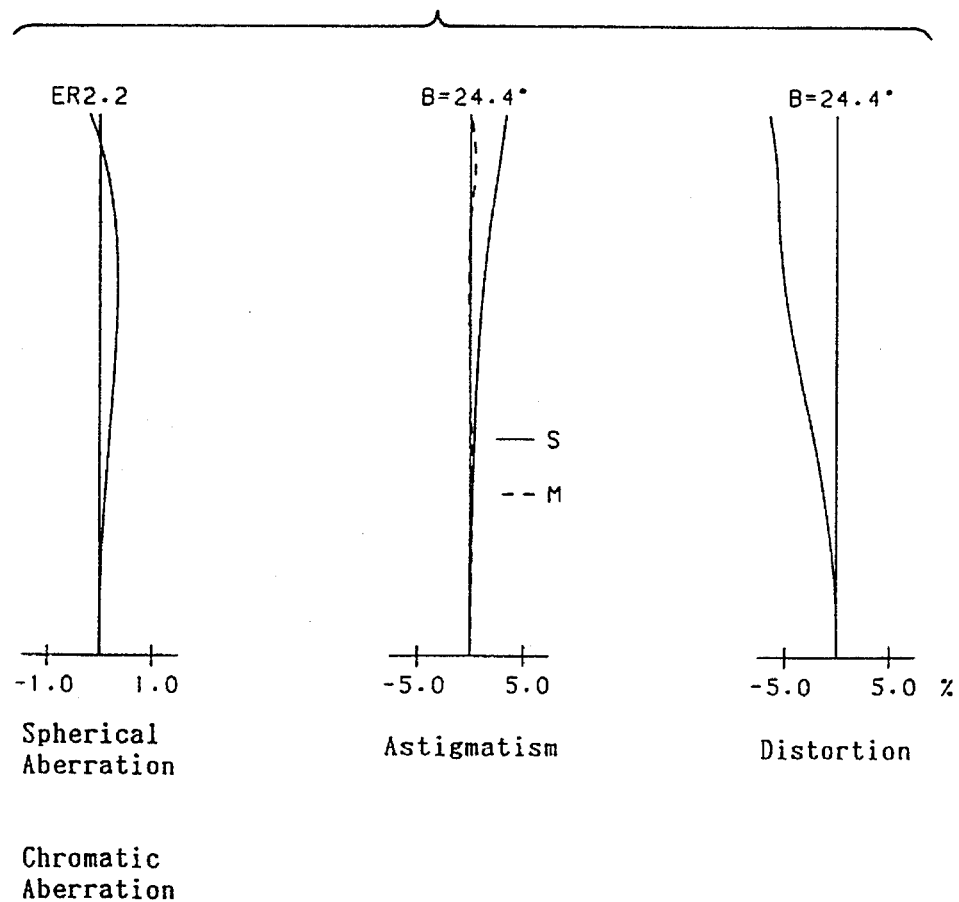
FIG. 14 shows various aberration diagrams of the telescope shown in FIG. 13.

FIG. 13 shows a lens arrangement of a telescope which is provided with the master telescope shown in FIG. 7 and the rear converter 13 (rear conversion lens) located on the image side of the objective lens group, according to a third embodiment of the present invention. Lens data of the telescope shown in FIG. 13 is shown in Table 4 below. Diagrams of various aberrations thereof are shown in FIG. 14. Surface Nos. 8 and 9 correspond to the rear conversion lens 13.

TABLE 4

ER = 2.2  W = 3.2  B = 24.4°  $f_o'$ = 104.16
$f_o'/f_o$ = 1.30

| Surface No. | R | D | $N_d$ | $v_d$ |
|---|---|---|---|---|
| 1 | 46.478 | 4.60 | 1.51633 | 64.1 |
| 2 | −34.850 | 1.50 | 1.62004 | 36.3 |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 8.86 | — | — |
| 8* | −8.277 | 4.50 | 1.49176 | 57.4 |
| 9* | −100.000 | 6.76 | — | — |
| 10* | 57.904 | 1.60 | 1.58547 | 29.9 |
| 11 | 8.960 | 7.15 | 1.49176 | 57.4 |
| 12 | −13.730 | 0.30 | — | — |
| 13 | 17.093 | 5.12 | 1.48749 | 57.4 |
| 14 | −17.903 | — | — | — |

*denotes aspherical surface.
Aspherical data;
No. 8; K = −0.100, A4 = −0.10860 × $10^{-2}$, A6 = 0.72865 × $10^{-4}$, A8 = −0.13566 × $10^{-5}$
No. 9; K = 0, A4 = −0.39279 × $10^{-2}$, A6 = 0.13837 × $10^{-3}$, A8 = −0.17565 × $10^{-5}$
No. 10; K = −0.895, A4 = −0.29670 × $10^{-3}$, A6 = −0.91000 × $10^{-6}$.

Fourth Embodiment

Figure 15:
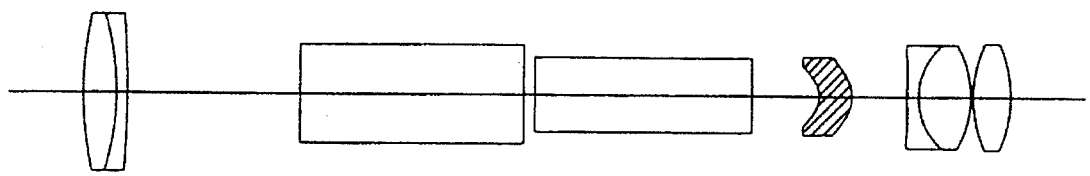
FIG. 15 is a schematic view of a lens arrangement of the master telescope shown in FIG. 7, having therein a rear conversion lens according to a fourth embodiment of the present invention.
Figure 16:
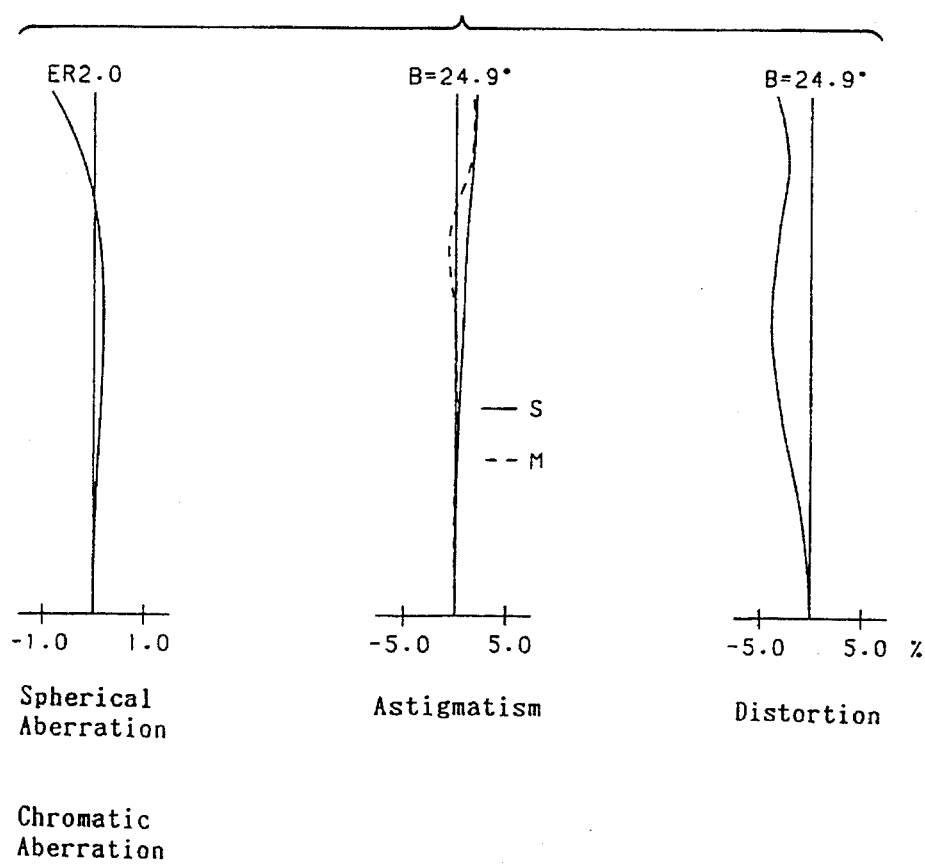
FIG. 16 shows various aberration diagrams of the telescope shown in FIG. 15.

FIG. 15 shows a lens arrangement of a telescope which is provided with the master telescope shown in FIG. 7 and the rear converter 13 (rear conversion lens) located on the image side of the objective lens group, according to a fourth embodiment of the present invention. Lens data of the telescope shown in FIG. 15 is shown in Table 5 below. Diagrams of various aberrations thereof are shown in FIG. 16. Surface Nos. 8 and 9 correspond to the rear conversion lens 13.

TABLE 5

ER = 2.0  W = 3.3  B = 24.9°  $f_o'$ = 115.93
$f_o'/f_o$ = 1.45

| Surface No. | R | D | $N_d$ | $v_d$ |
|---|---|---|---|---|
| 1 | 46.478 | 4.60 | 1.51633 | 64.1 |
| 2 | −34.850 | 1.50 | 1.62004 | 36.3 |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 7.19 | — | — |
| 8 | −3.442 | 4.50 | 1.49176 | 57.4 |
| 9 | −5.135 | 7.67 | — | — |
| 10* | 57.904 | 1.60 | 1.58547 | 29.9 |
| 11 | 8.960 | 7.15 | 1.49176 | 57.4 |
| 12 | −13.730 | 0.30 | — | — |
| 13 | 17.093 | 5.12 | 1.48749 | 57.4 |
| 14 | −17.903 | — | — | — |

*denotes aspherical surface.
Aspherical data;
No. 8; K = −0.100, A4 = 0.20408 × $10^{-2}$, A6 = 0.26269 × $10^{-3}$, A8 = −0.67037 × $10^{-5}$
No. 9; K = −0.100, A4 = −0.25275 × $10^{-2}$, A6 = 0.15766 × $10^{-3}$, A8 = −0.24506 × $10^{-5}$
No. 10; K = −0.895, A4 = −0.29670 × $10^{-3}$, A6 = −0.91000 × $10^{-6}$.

Fifth Embodiment

Figure 17:
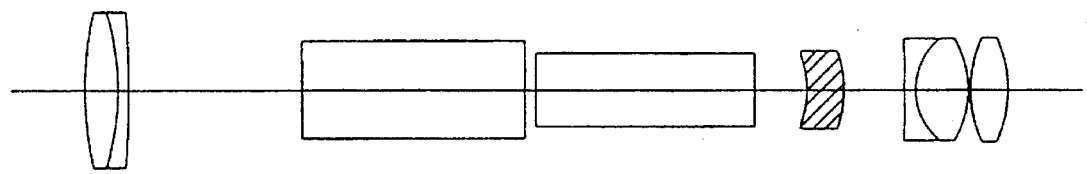
FIG. 17 is a schematic view of a lens arrangement of the master telescope shown in FIG. 7, having therein a rear conversion lens according to a fifth embodiment of the present invention.
Figure 18:
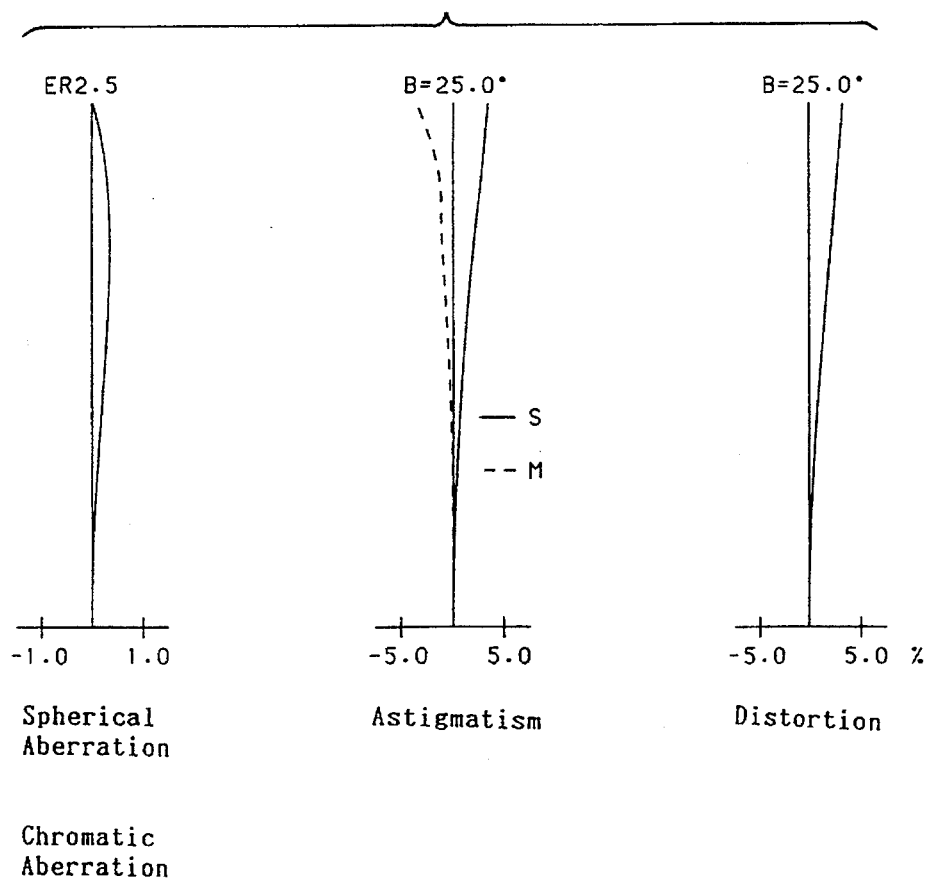
FIG. 18 shows various aberration diagrams of the telescope shown in FIG. 17.

FIG. 17 shows a lens arrangement of a telescope which is provided with the master telescope shown in FIG. 7 and the rear converter 13 (rear conversion lens) located on the image side of the objective lens group, according to a fifth embodiment of the present invention. Lens data of the telescope shown in FIG. 17 is shown in Table 6 below. Diagrams of various aberrations thereof are shown in FIG. 18. Surface Nos. 8 and 9 correspond to the rear conversion lens 13.

TABLE 6

ER = 2.5  W = 3.3  B = 25.0°  $f_o'$ = 92.64
$f_o'/f_o$ = 1.16

| Surface No. | R | D | $N_d$ | $v_d$ |
|---|---|---|---|---|
| 1 | 46.478 | 4.60 | 1.51633 | 64.1 |
| 2 | −34.850 | 1.50 | 1.62004 | 36.3 |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 7.19 | — | — |
| 8 | −13.000 | 5.04 | 1.60311 | 60.7 |
| 9 | −16.000 | 8.42 | — | — |
| 10* | 57.904 | 1.60 | 1.58547 | 29.9 |
| 11 | 8.960 | 7.15 | 1.49176 | 57.4 |
| 12 | −13.730 | 0.30 | — | — |
| 13 | 17.093 | 5.12 | 1.48749 | 57.4 |
| 14 | −17.903 | — | — | — |

*denotes aspherical surface.
Aspherical data;
No. 10; K = −0.895, A4 = −0.29670 × $10^{-3}$, A6 = −0.91000 × $10^{-6}$.

Sixth Embodiment

Figure 19:
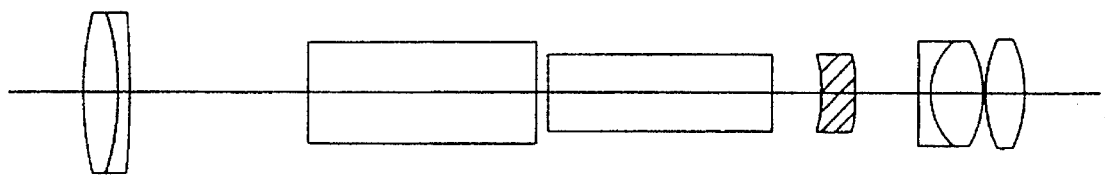
FIG. 19 is a schematic view of a lens arrangement of the master telescope shown in FIG. 7, having therein a rear conversion lens according to a sixth embodiment of the present invention; and, FIG. 20 shows various aberration diagrams of the telescope shown in FIG. 19.
Figure 20:
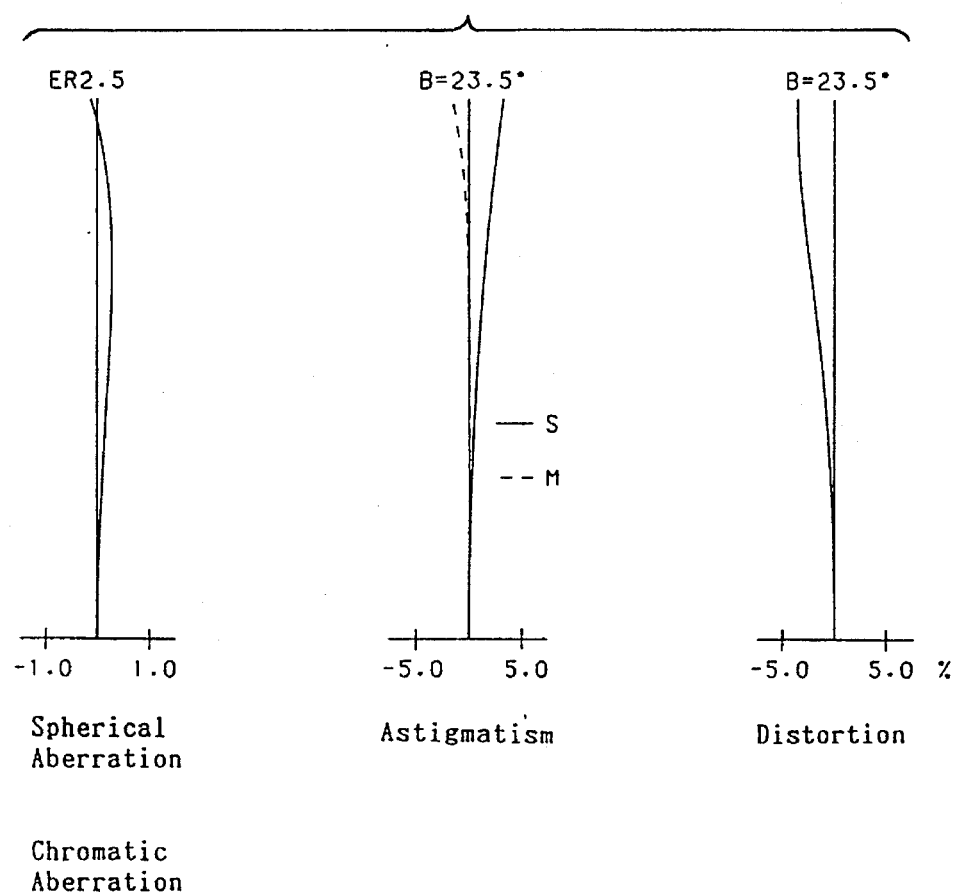

FIG. 19 shows a lens arrangement of a telescope which is provided with the master telescope shown in FIG. 7 and the rear converter 13 (rear conversion lens) located on the image side of the objective lens group, according to a sixth embodiment of the present invention. Lens data of the telescope shown in FIG. 19 is shown in Table 7 below. Diagrams of various aberrations thereof are shown in FIG. 20. Surface Nos. 8 and 9 correspond to the rear conversion lens 13.

TABLE 7

ER = 2.5  W = 3.3  B = 23.5°  $f_o'$ = 92.32
$f_o'/f_o$ = 1.15

| Surface No. | R | D | $N_d$ | $v_d$ |
|---|---|---|---|---|
| 1 | 46.478 | 4.60 | 1.51633 | 64.1 |
| 2 | −34.850 | 1.50 | 1.62004 | 36.3 |

TABLE 7-continued

| ER = 2.5 | W = 3.3 | B = 23.5° | $f_o'$ = 92.32 | |
|---|---|---|---|---|
| | $f_o'/f_o$ = 1.15 | | | |
| Surface No. | R | D | $N_d$ | $v_d$ |
| 3 | −139.150 | 24.00 | — | — |
| 4 | ∞ | 30.00 | 1.56883 | 56.3 |
| 5 | ∞ | 1.50 | — | — |
| 6 | ∞ | 30.00 | 1.56883 | 56.3 |
| 7 | ∞ | 6.61 | — | — |
| 8* | −30.000 | 4.50 | 1.49176 | 57.4 |
| 9* | −57.942 | 8.62 | — | — |
| 10* | 57.904 | 1.60 | 1.58547 | 29.9 |
| 11 | 8.960 | 7.15 | 1.49176 | 57.4 |
| 12 | −13.730 | 0.30 | — | — |
| 13 | 17.093 | 5.12 | 1.48749 | 57.4 |
| 14 | −17.903 | — | — | — |

*denotes aspherical surface.
Aspherical data;
No. 8; K = 0.828, A4 = −0.76970 × $10^{-3}$, A6 = 0.14156 × $10^{-3}$,
No. 9; K = 0.524, A4 = −0.16543 × $10^{-2}$, A6 = 0.23549 × $10^{-4}$,
No. 10; K = −0.895, A4 = −0.29670 × $10^{-3}$, A6 = −0.91000 × $10^{-6}$.

The values of formulae (1) and (2) in the first to sixth embodiments are shown in Table 8 below.

TABLE 8

| | formula (1) | formula (2) |
|---|---|---|
| embodiment 1 | 1.30 | 0.977 |
| embodiment 2 | 1.30 | 1.106 |
| embodiment 3 | 1.30 | 1.035 |
| embodiment 4 | 1.45 | 0.962 |
| embodiment 5 | 1.16 | 0.936 |
| embodiment 6 | 1.15 | 1.079. |

As can be seen from Table 8 above, all of the six embodiments satisfy the requirements defined by formulae (1) and (2). Moreover, in the telescope according to the present invention, there is substantially no adverse influence on the various aberrations of the master telescope. Namely, the telescope according to the present invention is substantially equivalent to the master telescope in view of the aberrations.

Table 9 below shows values related to formula (3). Lens data of the master telescope of embodiments 1 through 6 is as follows.

$f_o$=79.97
$f_e$=11.77
$f_o/f_e$=6.794
m=7
α=−0.029.

TABLE 9

| | $f_o'$ | $f_e$ | $f_o'/f_e$ | p | α' |
|---|---|---|---|---|---|
| embodiment 1 | 103.85 | 11.77 | 8.823 | 2 | −0.020 |
| embodiment 2 | 104.16 | 11.77 | 8.850 | 2 | −0.017 |
| embodiment 3 | 104.16 | 11.77 | 8.850 | 2 | −0.017 |
| embodiment 4 | 115.93 | 11.77 | 9.850 | 3 | −0.015 |
| embodiment 5 | 92.64 | 11.77 | 7.871 | 1 | −0.016 |
| embodiment 6 | 92.32 | 11.77 | 7.844 | 1 | −0.020 |

As may be understood from the above discussion, according to the present invention, the rear converter can be incorporated in the master telescope without reducing the eye relief and causing the eclipse of ambient light. Moreover, the rear converter which can be made of a single lens is inexpensive and has no adverse influence on the aberrations.

We claim:
1. A telescope with a rear converter, comprising:
   a master telescope whose aberration has been independently corrected and which has an objective lens and an ocular lens; and
   a rear conversion lens provided on an image side of said objective lens of said master telescope, said rear conversion lens being made of a single lens having a concave surface facing an object side;
   wherein said rear conversion lens satisfies the following formulae;

$f_o'/f_o$>1, and $0.5 > (dx_2/dh_2)/(dx_1/dh_1) > 1.3$ wherein,
   "$f_o$" designates a focal length of said objective lens of the master telescope;
   "$f_o'$" designates a resultant focal length of said objective lens of said master telescope and said rear conversion lens;
   "$dx_1/dh_1$" designates an inclination of an incident surface of said rear conversion lens at an incident point thereof, upon which light is incident at a height $h_1$ from an optical axis of the rear conversion lens; and,
   "$dx_2/dh_2$" designates an inclination of an emission surface of said rear conversion lens at an emission point thereof, at which light is emitted from the rear conversion lens at a height $h_2$ from the optical axis;
   and wherein $h_1=0.36(f_o)^2/mf_o'$, $h_2=0.36(f_o)/m$, and m=magnification of said master telescope.

2. A telescope with a rear converter according to claim 1, wherein said rear conversion lens is provided with at least one aspherical surface.

3. A telescope having an ocular lens, said ocular lens comprising:
   a single lens having a concave surface that faces an object side; and
   a positive lens group, in this order from the object side, wherein the following relationships are satisfied;

$f_{e2}/f_e'$>1 and $0.5<(dx_3/dh_3)/(dx_4/dh_4)<1.3$ wherein
   $f_e'$=focal length of said ocular lens;
   $f_{e2}$=focal length of said positive lens group;
   "$dx_3/dh_3$" =inclination of an incident surface of said single lens at an incident point thereof, upon which light is incident at a height $h_3$ from an optical axis;
   $dx_4/dh_4$=inclination of an emission surface of said single lens at an emission point thereof, at which light is emitted from the single lens at a height $h_4$ from the optical axis;
   where $h_3=0.36(f_e')^2/f_{e2}$;
   $h_4=0.36(f_e)$.

4. A telescope according to claim 3, wherein said single lens is provided with at least one aspherical surface.

5. A rear conversion lens for a master telescope whose aberration has been independently correctly and comprising an objective lens and an ocular lens, said rear conversion lens being provided on an image side of said objective lens of said master telescope, wherein said rear conversion lens is made of a single lens having a concave surface facing an object side and satisfying the following relationships;

$$f_o''/f_o>1$$

and $$0.5<(dx_2/dh_2)/(dx_1/dh_1)<1.3$$

wherein,

"$f_o$" designates a focal length of said objective lens of the master telescope;

"$f_o'$" designates a resultant focal length of said objective lens of said master telescope and said rear conversion lens;

"$dx_1/dh_1$" designates an inclination of an incident surface of said rear conversion lens at an incident point thereof, upon which light is incident at a height $h_1$ from an optical axis of the rear conversion lens; and, "$dx_2/dh_2$" designates an inclination of an emission surface of said rear conversion lens at an emission point thereof, at which light is emitted from the rear conversion lens at a height $h_2$ from the optical axis; respectively, and wherein $h_1=0.36(f_o)^2/mf_o'$, $h_2=0.36(f_o)/m$, and m-magnification of said master telescope.

6. A rear conversion lens according to claim 5, wherein at least one aspherical surface is provided.

7. A telescope comprising:

a master telescope whose aberration has been independently corrected and which has an objective lens and an ocular lens; and a single lens provided on an image side of said objective lens of said master telescope and having a concave surface facing an object side;

wherein said single lens satisfies the following formulae $$f_o''/f_o>1$$

and $$0.5<(dx_2/dh_2)/(dx_1/dh_1)<1.3$$

wherein,

"$f_o$" designates a focal length of said objective lens of the master telescope;

"$f_o'''$" designates a resultant focal length of said objective lens of said master telescope and said rear conversion lens;

"$dx_1/dh_1$" designates an inclination of an incident surface of said rear conversion lens at an incident point thereof, upon which light is incident at a height $h_1$ from an optical axis of the rear conversion lens; and, "$dx_2/dh_2$" designates an inclination of an emission surface of said rear conversion lens at an emission point thereof, at which light is emitted from the rear conversion lens at a height $h_2$ from the optical axis; respectively, and wherein $h_1=0.36(f_o)^2/mf_o'$, $h_2=0.36(f_o)/m$, and m=magnification of said master telescope.

8. A telescope with a rear converter, comprising:

a master telescope whose aberration has been independently corrected and which has an objective lens and an ocular lens; and a rear conversion lens provided on an image side of the objective lens of said master telescope, said rear conversion lens comprising a single lens having a concave surface that faces towards an object;

said objective lens and said ocular lens of said master telescope satisfying the following relationships;

$$f_o/f_e=(1+\alpha)m$$

$$f_o'/f_e=(1+\alpha')(m+p)$$

wherein, $|\alpha|\leq 0.05$, m=magnification (integer), $1\leq m\leq 20$;

$f_o$ designates the focal length of said objective lens of the master telescope; $f_e$ designates the focal length of said ocular lens of the master telescope;

$|\alpha'|\leq 0.05$, p=1, 2, 3, 4 or 5, and $f_o'$ represents a resultant focal length of the objective lens of the master telescope and the rear conversion lens.

9. A rear conversion lens for a master telescope whose aberration has been independently corrected and which comprises an objective lens and an ocular lens, said rear conversion lens provided on an image side of said objective lens of said master telescope;

said objective lens and said ocular lens of said master telescope satisfying the following relationships;

$$f_o/f_e=(1+\alpha)m$$

$$f_o'/f_e(=1+\alpha')(m+p)$$

wherein $|\alpha|\leq 0.05$, m=magnification (integer), $1\leq m 20$); and $|\alpha'|\leq 0\ 0.05$ p=1, 2, 3, 4 or 5

$f_o$ designates the focal length of the objective lens of the master telescope;

$f_e$ represents the focal length of the ocular lens of the master telescope; and $f_o'$ represents the resultant focal length of the objective lens of the master telescope and the rear conversion lens.

* * * * *

UNITED STATES PATENT AND TRADEMARK OFFICE
CERTIFICATE OF CORRECTION

PATENT NO. : 5,589,976
DATED : December 31, 1996
INVENTOR(S) : M. KANAI et al.

It is certified that error appears in the above-indentified patent and that said Letters Patent is hereby corrected as shown below:

Title page, section [57], "ABSTRACT", line 18, change "$mf_0$" to ---$mf_0'$---.

At column 12, line 18 (claim 1, line 13), change "$0.5 > (dx_2/dh_2)/(dx_1/dh_1) > 1.3$" to ---$0.5 < (dx_2/dh_2)/(dx_1/dh_1) < 1.3$---.

At column 13, line 43 (claim 7, line 8), after "formulae" insert ---:---.

At column 14, line 18 (claim 8, line 10), change ";" to ---:---.

At column 14, line 23 (claim 8, line 12), change "$f_0/f_e$" to ---$f'_0/f_e$---.

At column 14, line 44 (claim 9, line 9), change "(=" to ---=(---.

UNITED STATES PATENT AND TRADEMARK OFFICE
CERTIFICATE OF CORRECTION

PATENT NO. : 5,589,976
DATED : December 31, 1996
INVENTOR(S) : M. KANAI et al.

It is certified that error appears in the above-indentified patent and that said Letters Patent is hereby corrected as shown below:

At column 14, line 47 (claim 9, line 14), change "m20" to ---$m \leq 20$---.

At column 14, line 47 (claim 9, line 14), change ");" to ---;---.

Signed and Sealed this

Fifteenth Day of April, 1997

Attest:

BRUCE LEHMAN

Attesting Officer    Commissioner of Patents and Trademarks